United States Patent [19]

Croome et al.

[11] 4,072,624

[45] Feb. 7, 1978

[54] GELATIN COMPOSITION

[75] Inventors: Ronald John Croome, Rhiwbina; Donald Beuford Thomas, Creigiau, both of Wales

[73] Assignee: P. Leiner & Sons Limited, Treforest, Wales

[21] Appl. No.: 733,416

[22] Filed: Oct. 18, 1976

[30] Foreign Application Priority Data

Oct. 20, 1975 United Kingdom ............... 43012/75

[51] Int. Cl.[2] ............................................ C09K 11/00

[52] U.S. Cl. .................................. 252/301.35; 96/82; 106/137; 260/2 EN

[58] Field of Search .................................... 260/2 EN; 252/301.21–301.32, 301.34–301.35; 96/82; 427/158; 106/137

[56] References Cited

U.S. PATENT DOCUMENTS

| | | | |
|---|---|---|---|
| 3,181,949 | 5/1965 | Koerber et al. | 96/82 |
| 3,423,483 | 1/1969 | Anyos et al. | 260/860 |
| 3,462,388 | 8/1969 | Horiguchi et al. | 260/41 |
| 3,580,720 | 5/1971 | Ohyama et al. | 96/82 |
| 3,615,544 | 10/1971 | Amano et al. | 96/82 |
| 3,666,680 | 5/1972 | Briggs | 252/316 |
| 3,677,762 | 7/1972 | Amano et al. | 96/74 |
| 3,749,707 | 7/1973 | Vrancken et al. | 260/117 |
| 3,838,063 | 9/1974 | Foss | 252/301.35 |

*Primary Examiner*—Aaron Weisstuch
*Attorney, Agent, or Firm*—Blanchard, Flynn, Thiel, Boutell & Tanis

[57] ABSTRACT

The invention provides a compound obtained by chemically reacting a gelatin-compatible polymer having a multiplicity of functional groups with an optical brightening agent having only a single functional group reactive with the said functional groups of the polymer. The resulting compound can be mixed with gelatin to give a gelling system for the formation of gels, e.g. coating films, which are resistant to washing or leaching out of the optical brightening agent, thus overcoming the problem of the lack of substantivity of the agent in systems involving a simple mixture of gelatin with optical brightening agent.

11 Claims, No Drawings

GELATIN COMPOSITION

This invention relates to optical brightening agents and to their use in photographic coatings.

Optical brightening agents (OBA's) are used extensively in the photographic industry to increase the brightness of prints and to improve the whiteness of borders. One major disadvantage has been the need to use excessive amounts of OBA to ensure the retention of effective quantities on the substrate after water soaking and rinsing. This increases the cost of processing and methods for increasing the substantivity of OBA's have therefore been sought.

The present invention provides a gelatin-compatible reaction product of an OBA with a synthetic polymer having a multiplicity of functional groups for reaction with the OBA. It also provides a composition comprising gelatin and such a reaction product, and a coating film comprising such a composition.

Typical optical brightening agents are substituted cyanuric chloride derivatives of diaminostilbenes with the general formula

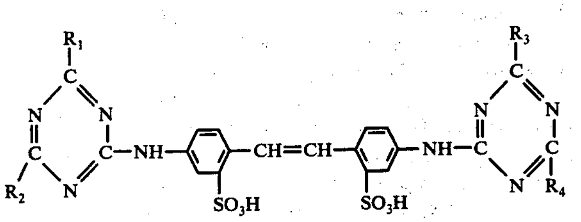

The sulphonic acid groups confer water solubility on the compound.

The OBA can, for example, be of the above formula where $R_1$ and $R_3$ are morpholine radicals, $R_2$ is a diethanolamine radical, and $R_4$ is chlorine.

A commercially available OBA of the latter formula is "Photine CL". This type of chemical can be reacted with gelatin-campatible synthetic polymers containing primary amino groups which are more accessible than those in gelatin.

A preferred synthetic polymer for reaction with the OBA is polyethyleneimine, derived from

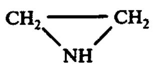

e.g. Polymin P, manufactured by B.A.S.F. This is potentially very useful since it contains up to 30% of nitrogen as primary amine groups and is compatible with gelatin.

The advantage of the invention is that, where the OBA and synthetic polymer react substantially quantitatively, the reaction product can be blended with gelatin to give a composition containing the required proportion of permanently retained OBA, the presence of excess OBA to cater for losses on washing being unnecessary. The greater the degree of substitution in the polymer that is obtained in the polymer-OBA reaction, the smaller is the amount of the reaction product needed when added to gelatin to achieve the required OBA level in composition.

Polyethyleneimine contains primary, secondary and tertiary amino groups, and 30% of the nitrogen exists as primary amino groups. Taking polyethyleneimine as $-(CH_2-CH_2NH)_n-$ this amounts to 0.7 moles amino groups per 100g. polyethyleneimine.

Substantivities of the coating compositions on film base have been assessed by coating with 10% (with respect to gelatin) solutions, and immersing 2 inches × 2 inches sections in 25 ml. cold distilled water for 3 hours. The amount of OBA leached out was determined by measuring the U.V. absorbance of the soak liquors at 360 n.m. The total amount of composition on the film base was determined by soaking similar sections in 25 ml. water at 60° C. and determining the U.V. absorbance of the resulting solutions.

EXAMPLE 1

Reaction of OBA with Polyethyleneimine.

Samples of Polymin P were made up to 100 ml. with water and heated to 60° C. Their pH was allowed to remain at 11.0. The OBA ("Photine GL") was dissolved in 100 ml. water and added to the Polymin P solutions at 60° C. Reaction was allowed to continue for 1 hour and the pH of the resulting solution was adjusted to 5.5 and the volume to 200 ml. The compositions of the solutions were:

| | A. | B. |
|---|---|---|
| Polyethyleneimine | 10g. | 10g. |
| OBA | 10g. | 5g. |
| Composition Volume. | 200 ml. | 200 ml. |

50 ml. of A and 100 ml. of B were added to respective 50 g. lots of alkali-processed gelatin dissolved in water, and the resulting solutions made up to 500 ml. Both solutions contained 5% OBA based on the weight of gelatin.

The above mixtures were coated as described above, and substantivity assessed on the amount of OBA released from 2 inches × 2 inches sections into 25 ml. cold water over 3 hours. Duplicate measurements were made. The results are quoted in the following Table:

Substantivity of OBA in coatings comprising gelatin and Polymin P/OBA complex.

| | Absorbance (360 n.m.) | | | | % |
|---|---|---|---|---|---|
| Sample | Total (1) | Cold Water Soak (3 hrs) (2) | Residue on film (3) | Recovery (2)+(3) | Retention (1)−(2)/(1)% |
| A | 1.22 | 0.145 | 1.075 | 1.22 | 88 |
| B | 1.30 | 0.128 | 1.185 | 1.31 | 90 |

These results show that reaction has been effected between the OBA and Polymin P giving a substantial degree of substantivity.

EXAMPLE 2

200g. Polymin P was dissolved in 1.0 liter water and to it was added 100g. OBA ("Photine GL") in 1.0 liter water at 60° C over a period of 15 minutes. Reaction was continued for a further hour at the end of which time the pH was adjuated to 5.5.

2 kg. of alkali-processed bone gelatin were dissolved in 6 liters water, and the Polymin P/OBA complex was added to it at 60° C. with continuous stirring until completely mixed. There was a significant increase in viscosity at this stage. The sol. was allowed to cool, set in trays, then minced and dried. The dried material then contained 4.5% by weight of OBA.

Coating trails were conducted as described above.

U.V. absorbance showed OBA substantivity as follows:

Total in coating — 1.47

After cold water soak for 3 hours — 0.092

% Retention on film — 96%.

Physical properties of the product are as follows:

| | Polymin P/OBA/ gelatin combination. | Parent Gelatin. |
|---|---|---|
| Bloom (g) | 245 | 252 |
| pH | 5.1 | 5.8 |
| Viscosity 6.2/3% 40° C. (cS). | 15.8 | 7.92 |
| Moisture (%) | 7.6 | 9.8 |

The viscosity increase observed during preparation is reflected in these analysis figures.

The composition according to the invention can be used as a top coat layer or as a backing layer on photographic paper. In compositions according to the invention the proportion of OBA based on the weight of gelatin is suitably 5% as in the above Examples; the amount of OBA used in the preparation of the OBA/synthetic polymer compound is suitably up to 100 wt. % of the synthetic polymer, e.g. 50 to 100 wt. % as also illustrated in the Examples. These values are not essential however, but may be varied, and do not imply limitation on the proportion of OBA/synthetic polymer compound that may be incorporated into the gelatin.

The OBAs useful in this invention are monofunctional relative to the polymer, i.e. have only a single group reactive with the polymer functional groups — thus "Photine GL" has a single functional group ($R_4$, chlorine) for reaction with the amino groups of Polymin P. An OBA bi- or polyfunctional relative to the polymer would cross-link the polymer and render it insoluble in water.

We claim:

1. The product of the chemical reaction of a synthetic polymer having a multiplicity of primary amino groups with an optical brightening agent having a single functional group per molecule for reaction with the said primary amino groups of the polymer, said product being capable of forming a homogeneous aqueous solution with gelatin.

2. A reaction product according to claim 1 wherein the optical brightening agent has the formula

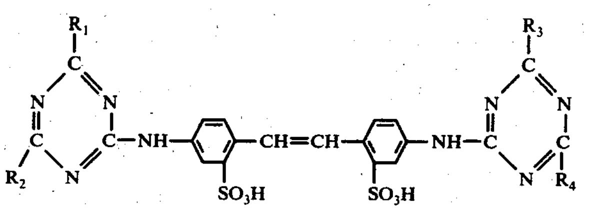

wherein $R_4$ is the said single functional group and $R_1$, $R_2$ and $R_3$ are each substituents non reactive to said polymer.

3. A reaction product according to claim 2 wherein $R_1$ and $R_3$ are morphalino, $R_2$ is diethanolamino, and $R_4$ is chloro.

4. A reaction product according to claim 3 wherein the synthetic polymer is polyethyleneimine.

5. A reaction product according to claim 1 wherein the synthetic polymer is polyethyleneimine.

6. A reaction product according to claim 1 containing up to 100 wt. % of said optical brightening agent based on the synthetic polymer.

7. A reaction product according to claim 6 containing from 50 to 100 wt. % of said optical brightening agent based on the synthetic polymer.

8. A composition comprising gelatin and a reaction product according to claim 1.

9. A composition according to claim 8 containing 5 wt. % of said optical brightening agent based on the gelatin.

10. A homogeneous aqueous solution of gelatin and a reaction product according to claim 1.

11. A homogeneous dried film cast from a solution according to claim 10.

* * * * *